May 28, 1946.  A. CLARKSON  2,400,977
PREHEATING SYSTEM FOR INTERNAL-COMBUSTION ENGINES
Original Filed Dec. 24, 1943
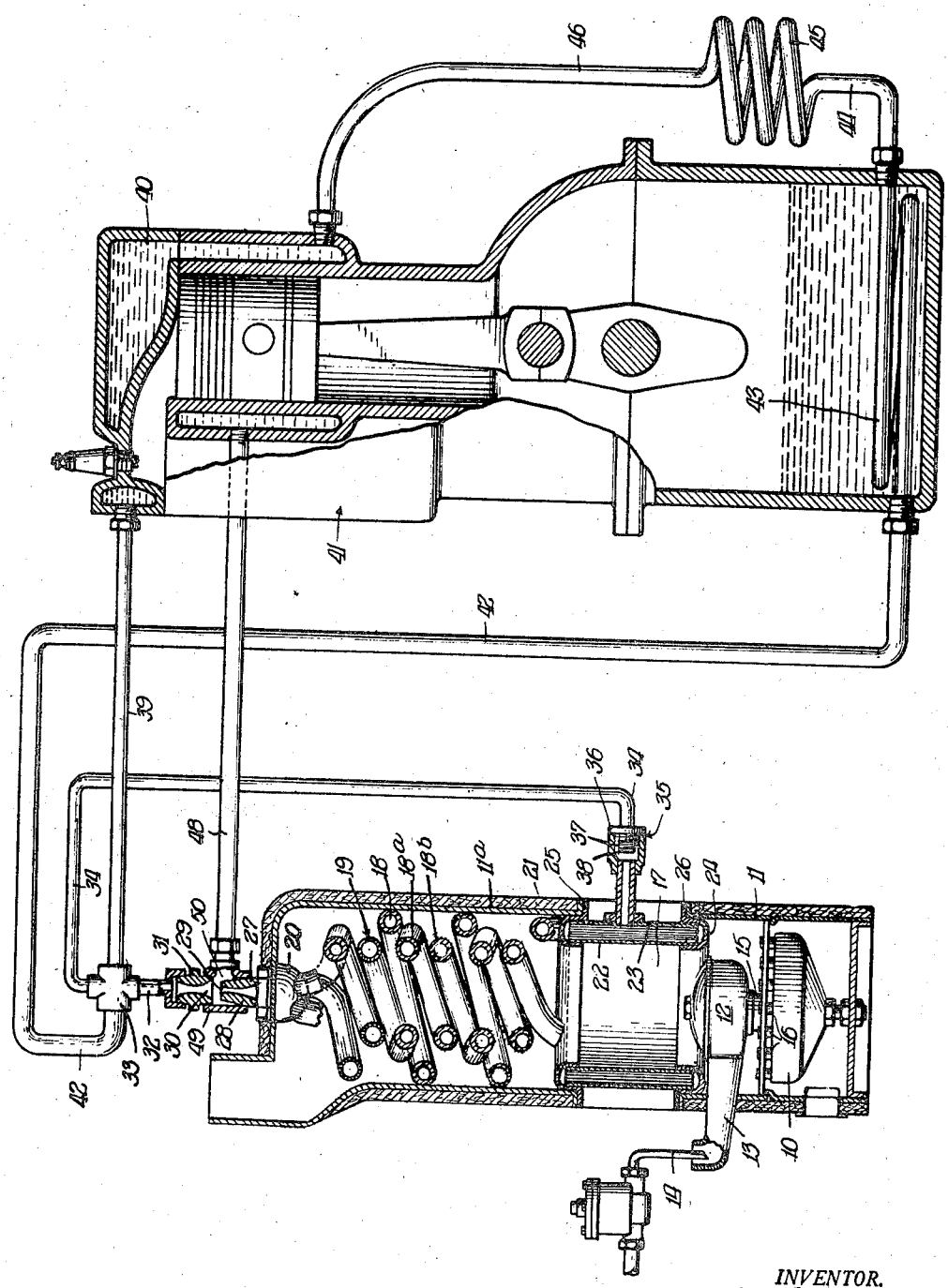
INVENTOR.
Alick Clarkson
BY Barnett & Gillespie.
Attorneys.

Patented May 28, 1946

2,400,977

UNITED STATES PATENT OFFICE 2,400,977

PREHEATING SYSTEM FOR INTERNAL-COMBUSTION ENGINES

Alick Clarkson, Bloomingdale Township, Du Page County, Ill.

Original application December 24, 1943, Serial No. 515,556. Divided and this application August 19, 1944, Serial No. 550,178

10 Claims. (Cl. 123—142.5)

This invention relates to certain new and useful improvements in a preheating system for internal combustion engines.

The present invention is directed broadly to a hot liquid circulating system, including a liquid heating member and certain special connections suitable for heating a body of liquid at a location remote from the heater member.

It is therefore a principal object of the invention to provide, in combination with a liquid heater, the improvements hereinafter shown and described whereby a large body of liquid, including a liquid body remote from the heater, may be heated both quickly and economically. The invention includes certain improved features whereby the system will function as a regenerative circulating system and also as a thermal pump circulating system.

Specifically the invention is designed with a view of providing a satisfactory apparatus for preheating liquid cooled engines in cold weather so as to heat the liquid circulating system thereof, together with the oil supply in the crank case and such other equipment as may require heat in order to improve its efficiency, for example, the battery for supplying the electric current to the ignition, and electric appliances of the vehicle.

A further specific object of the invention is to provide in a circulating system of the above character an injector means suitable for introducing the heated liquid into a circulating system associated with the coolant jacket of an internal combustion engine in which a portion of the liquid is recirculated through said circulating system without passing through the liquid heater. In this connection the invention makes use of an injector for passing the liquid from the heater into the coolant circulating system of the engine. One conduit leading from the engine jacket returns a portion of the liquid to the injector casing and is thereby mixed with the higher temperature liquid and reintroduced into the engine jacket by said injector action. Another conduit, preferably aligned with the venturi of the injector nozzle, by-passes a portion of the liquid direct to the lower portion of the liquid heater.

The invention is illustrated in the accompanying drawing, wherein the figure is a vertical section through a liquid heater and through parts of an internal combustion engine with connections leading from the heater to the engine to illustrate the manner in which liquid is heated and delivered into the coolant jacket of the engine and other heating coils.

According to the invention the liquid heater includes an oil burner 10 enclosed within the heater casing 11. The burner may be of any suitable construction, but is preferably as disclosed in my co-pending application, Serial No. 515,555, filed December 24, 1943. However, inasmuch as the oil burner per se constitutes an independent invention and is disclosed and claimed in my said co-pending application, it is referred to herein only briefly. It includes a retort 12 adapted to receive a quantity of air through passage 13 and a controlled supply of liquid fuel from fuel delivery pipe 14. The retort 12 is positioned above the burner body so that the said fuel is thoroughly vaporized and mixed with the heated air in the retort. The mixture of vaporized fuel and hot air is then introduced into the burner body 10 through pipe 15. The rich gaseous mixture is discharged from the burner body through jet nozzles 16 and mixed with additional combustion air and burned in the heating chamber, 17 of the heater. The heat from the combustion gases is absorbed by coils 18, 18$^a$ and 18$^b$ containing the liquid to be heated and arranged in a novel and improved manner in the heating chamber 17 so as to function with maximum efficiency. The coils are separately formed and are preferably in the form of elongated loops 19 which crisscross the loops of the other coils so as to provide circuitous passages through which the hot gases of combustion must pass. In this way the hot gases are caused to directly contact the entire outer surfaces of the liquid heating coils. The upper ends of the several coils 18, 18$^a$ and 18$^b$ are united in a common fitting 20 from which the heated liquid is discharged into the circulating system.

The lower ends of the coils 18, 18$^a$ and 18$^b$ are connected in openings in an upper cap 21 of a preheating jacket. The said preheating jacket includes the upper cap 21, inner and outer side members 22 and 23, and a lower cap 24. The side members 22 and 23 may be conveniently formed by cutting suitable lengths from metal tubes of the desired diameter. The said caps 21 and 24 are preferably formed with outwardly extending flanges 25 and 26. The flange 26 of the lower cap rests on the upper edge of the lower section 11 of the heater casing. The flange 25 of the upper cap 21 provides a supporting seat for the upper section 11$^a$ of the heater casing.

The hot liquid from the coils 18, 18$^a$ and 18$^b$ discharges from the fitting into an injector 27. The injector includes a nozzle jet 28 which communicates with said fitting 20, with its discharge orifice 29 disposed adjacent the throat of a Venturi passage 30 formed in a nipple fitting 31 which is connected to a nipple 32 leading to a three outlet fitting 33. A conduit 34 of suitable size leads from fitting 33 to the lower portion of the liquid heater. Inasmuch as the liquid capacity of the heater is relatively small in relation to the total amount of liquid in the system as a whole, the pipe 34 may be relatively small. The entrance end of this conduit is arranged in alignment with the injector nozzle 28 and Venturi passage 30 so that the major force of the injector can be utilized to force the liquid through the conduit 34 and into the heater against the internal pressure. This by-passing of liquid from the injector 27 to the liquid heater constitutes the regenerative cycle of the heater. It accelerates the heating of the liquid and insures the high temperature desired to bring about efficient operation of the injector and in maintaining uniform distribution of the hot liquid in all parts of the circulating system.

A check valve 35 is interposed in the conduit 34. This valve may be of any suitable construction. However, it preferably includes a casing having a closure plug 36. A coil spring 37 is secured to the inner face of the plug and carries at its outer end a disk 38. The spirals of the spring are pressed together by the internal pressure in the heater to close the valve. Inasmuch as the operation of the injector produces a pulsing action in the circulating system, the check valve will be opened and closed in response to the pulsing variations in pressure within the liquid heater.

Another conduit designated 39, and preferably of a diameter to accommodate approximately 25% of the circulation, leads from the fitting 33 to the upper portion of the coolant jacket 40 of an internal combustion engine 41. This conduit provides a suitable vent for any air which may be trapped in the system and thereby facilitates automatic starting, the air being passed from the engine through the usual vent at the engine radiator. By venting the air in this manner, it is prevented from interfering with the injector action. The conduit 39 also delivers a suitable quantity of hot liquid to the upper portion of engine jacket 40 without resulting in excessive localized loss of heat at this point.

A conduit 42 of a capacity sufficient to accommodate approximately 65% of the circulation leads from fitting 33 through a radiator 43 located in the engine crank case for heating the lubricating oil. A conduit 44, connected with the outlet of radiator coil 43, leads to a second heating coil 45. The coil 45 may be utilized to warm the battery or other equipment of an automotive vehicle. From the outlet end of coil 45, a conduit 46 leads into the lower portion of the engine jacket 40. A conduit 48 leading from the engine jacket is connected into a T-fitting 49 which forms a part of the casing of injector 27. The nozzle 28 and Venturi nipple are fixed in proper relation by means of said T-fitting 49 to provide a chamber 50 surrounding the nozzle jet 28 and communicating with the entrance end of Venturi passage 30. As the liquid becomes heated and moves with increased velocity through the injector, the returned liquid from conduit 48 is entrained with the hot liquid from the injector nozzle 28. The entrained liquid is, therefore, heated by mixing with the higher temperature liquid from nozzle 28 and recirculated through the system without passing through the liquid heater.

In operation the oil burner is lighted so as to apply heat to the heater coil. The lower portion of the coil, for example the cylindrical water jacket portion, is heated principally by radiant heat, but the upper portion, due to the entwining of the elongated convolutions of the coil 18, 18ᵃ and 18ᵇ, is heated by the direct contact of the hot gases as they pass in and out of the circuitous passages formed by the irregular arrangement of the coils. The heated liquid will circulate very quickly so as to pass from the jet nozzle 28 into the Venturi passage 30 of the nipple 31 from which a portion thereof is returned through conduit 34, by the regenerative action, back to the heater, and another portion of the heated liquid is passed by conduit 39 into the upper portion of the engine jacket 40 preheat the coolant contained in said jacket. A portion of the heated liquid is also delivered into conduit 42 and thereby delivered into the lower portion of the engine jacket. However as soon as the temperature at the injector 49 becomes sufficient to cause the injector to function as a thermal pump, the return liquid from conduit 48 is entrained with the jet of high temperature liquid and recirculated through the system. The conduit 48 is of sufficient diameter to accommodate the liquid delivered into the engine jacket by both conduits 39 and 42. The liquid is delivered through conduit 42 into the coil 43, positioned in the lower portion of the crank case, so as to apply heat to the oil. The liquid then passes through battery heater case 45 and into the lower portion of the engine jacket 40. The liquid is returned from the engine jacket to the injector from which a part of the liquid is passed through the conduit 42 to the engine jacket and part is by-passed to the return end of the heater through conduit 34.

The specific circulating system also functions as above described so that the water discharged from the heater is ordinarily of a much higher temperature than if it were necessary for all of the water from the engine jacket 40 to pass through the heating coils of the water heater.

The present invention is directed particularly to the combination of the heater member and the circulating system whereby the apparatus functions to heat a body of liquid at a location remote from the heater member. The specific features of the heater member, therefore, are not claimed, per se, in this application except in so far as there is a direct cooperative relation between the specific constructions and the circulating system. The specific structural features of the heater member are shown and claimed in copending application, Serial No. 515,556, filed December 24, 1943, of which the present application is a division.

I claim:

1. A liquid heating and circulating system comprising, in combination, means defining a closed container having inlet and outlet ports and adapted to contain a body of liquid to be heated, means for applying heat thereto, an injector connected with said outlet, means remote from the heater for containing a second body of liquid to be heated, a conduit leading from the delivery end of the injector to said inlet of the first mentioned liquid body which vents the injector system to allow automatic starting, a conduit leading from the delivery end of said injector to the second body of liquid, and a conduit for returning liquid from the said second liquid body into the injector, whereby a portion of said returned liquid is delivered to the inlet of the first mentioned liquid body and a portion of said returned liquid is redelivered to said second liquid body.

2. A liquid heating and circulating system having a regeneration cycle and thermal pumping cycle for preheating a liquid body remote from the heater comprising means providing a container for said remote body of liquid, a liquid heater including a tube for containing the liquid to be heated, a delivery conduit leading from the heater to said remote liquid body, an injector for delivering the heated liquid into said delivery conduit, a return conduit for returning liquid from said remote liquid body into said injector, and a branch conduit leading from the delivery end of said injector to said liquid heater, whereby a portion of the return liquid from said injector is reintroduced into the liquid heater.

3. A liquid heating and circulating system for preheating a liquid body remote from the heater comprising means providing a container for said remote body of liquid, a liquid heater including coils for containing liquid to be heated, a delivery conduit leading from the heater to said remote liquid body, an injector for delivering the heated liquid into said delivery conduit, a return conduit leading from said remote liquid body into the injector whereby a portion of the return liquid is reintroduced by the thermal pumping action into said delivery conduit at said injector, a conduit for by-passing liquid direct from said injector to the inlet end of said heater, and a check valve interposed in said by-pass conduit.

4. A liquid heating and circulating system having a regenerative cycle and a thermal pump cycle for preheating an internal combustion engine comprising, in combination, an engine having a closed jacket for cooling liquid, a portable liquid heater, a delivery conduit leading from the heater to said jacket, an injector for delivering heated liquid under pressure into said delivery conduit, a return conduit leading from the jacket into the injector, a branch conduit of less capacity than said return conduit and leading from the said injector to the inlet of said heater whereby a portion of the liquid from the injector is reintroduced into the liquid heater.

5. A liquid heating and circulating system for preheating an internal combustion engine comprising, in combination, an engine having a closed jacket for cooling liquid, a portable liquid heater, a delivery conduit leading from the heater to said jacket, an injector for delivering heated liquid under pressure into said delivery conduit, a return conduit leading from the jacket into the injector, a radiator for applying heat to the oil pan of the engine, a conduit leading from the injector to said radiator, a conduit leading from said radiator into said engine jacket, a second radiator interposed in the last mentioned conduit at a location intermediate said radiator and said engine jacket, the said return conduit being of a capacity equivalent to the combined capacities of said delivery conduit and the conduit leading to said first mentioned radiator.

6. A liquid heating and circulating system for preheating the coolant liquid of an internal combustion system comprising in combination an engine having a closed jacket for cooling liquid, a liquid heater, a delivery conduit leading from the heater to said jacket, an injector for delivering heated liquid under pressure into said delivery conduit, return conduits leading from said jacket into the inlet of said heater.

7. A liquid heating and circulating system for preheating the coolant liquid of an internal combustion system comprising in combination an engine having a closed jacket for cooling liquid, a liquid heater, a delivery conduit leading from the heater to said jacket, an injector for delivering heated liquid under pressure into said delivery conduit, a return conduit leading from said jacket to said injector, and a return pipe leading from said injector to the inlet of the heater, whereby a portion of said return liquid is directed into the heater and another portion of said liquid is recirculated through said jacket.

8. A liquid heating and circulating system for preheating the coolant liquid of an internal combustion system comprising in combination an engine having a closed jacket for cooling liquid, a liquid heater, a delivery conduit leading from the heater to said jacket, an injector for delivering heated liquid under pressure into said delivery conduit, a return conduit leading from said jacket to said injector, a return pipe leading from said injector to the inlet of the heater, whereby a portion of said return liquid is directed into the heater and another portion of said liquid is recirculated through said jacket and a check valve interposed in the conduit leading to the inlet of the heater.

9. A liquid heating and circulating system for preheating the coolant liquid of an internal combustion system comprising in combination an engine having a closed jacket for cooling liquid, a liquid heater, an injector connected in the discharge end of the heater, a delivery pipe leading from said injector to the upper portion of said jacket, a second delivery conduit leading from said injector into the engine crank case and thence into another portion of said jacket, and a return conduit leading from said jacket to said injector.

10. A liquid heating and circulating system for preheating the coolant liquid of an internal combustion system comprising in combination an engine having a closed jacket for cooling liquid, a liquid heater comprising a series of coils arranged in close relation and having relatively steep spirals, whereby the hot water and steam flow upwardly through said coils in the form of bodies of liquid spaced apart by intermediate bodies of steam, an injector connected in the discharge end of the heater, a delivery pipe leading from said injector to the upper portion of said jacket, a second delivery conduit leading from said injector into the engine crank case and thence into another portion of said jacket, and a return conduit leading from said jacket to said injector.

ALICE CLARKSON.